Figure 1:
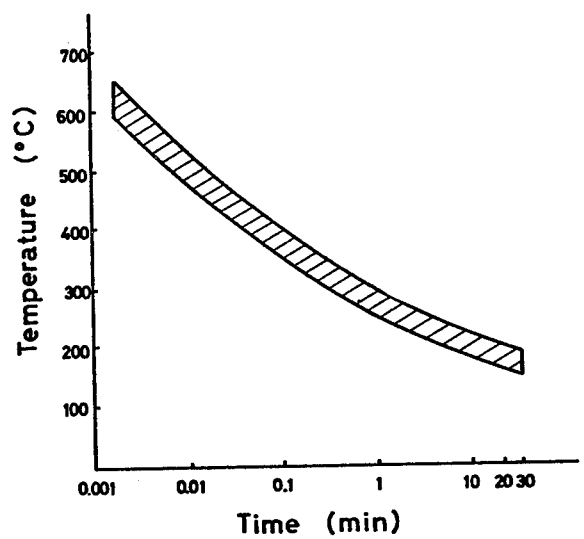

United States Patent [19]

Kishimoto et al.

[11] 4,080,417

[45] Mar. 21, 1978

[54] PROCESS FOR PRODUCING CARBON FIBERS HAVING EXCELLENT PROPERTIES

[75] Inventors: Soichiro Kishimoto; Saburo Okazaki, both of Okayama, Japan

[73] Assignee: Japan Exlan Company Limited, Osaka, Japan

[21] Appl. No.: 721,549

[22] Filed: Sep. 8, 1976

[30] Foreign Application Priority Data

Sep. 8, 1975 Japan ............................ 50-109368

[51] Int. Cl.$^2$ ............................................. B29C 25/00
[52] U.S. Cl. ............................... 264/29.2; 8/115.6; 264/206; 423/447.1; 427/175; 427/227; 427/379; 427/387
[58] Field of Search ............... 427/227, 379, 175, 387; 423/445, 448, 447, 447.1; 8/115.6; 264/206, 29.2

[56] References Cited

U.S. PATENT DOCUMENTS

| | | | |
|---|---|---|---|
| 3,032,434 | 5/1962 | Archibald | 427/227 |
| 3,779,789 | 12/1973 | Park | 427/227 |
| 3,975,482 | 8/1976 | Rulison | 427/227 |

*Primary Examiner*—Ronald H. Smith
*Assistant Examiner*—Janyce A. Bell
*Attorney, Agent, or Firm*—Wenderoth, Lind & Ponack

[57] ABSTRACT

A process for producing carbon fibers by heat-treating an acrylonitrile fiber, containing or impreganted with an aminosiloxane, at a temperature of at least 150° C for 0.1 second to 30 minutes so that the fiber contains 20 to 80 weight % undissolved matter upon immersing it in a 60% aqueous solution of sodium thiocyanate at 80° C for 20 minutes, and then carbonizing the fiber, whereby the productivity throughout the whole process, including the step of producing the precursor fiber and the step of producing the carbon fiber, is increased and a carbon fiber having high tensile strength and high modulus of elasticity is obtained in an industrially advantageous manner.

19 Claims, 2 Drawing Figures

PROCESS FOR PRODUCING CARBON FIBERS HAVING EXCELLENT PROPERTIES

The present invention relates to a process for producing carbon fibers (including graphite fibers) having excellent physical properties by using an acrylonitrile fiber as the starting material (socalled "precursor") for the heat treatment for obtaining said carbon fibers. More particularly, the invention is concerned with a process for producing carbon fibers by heat-treating under specific conditions an acrylonitrile fiber containing or impregnated with a specific aminosiloxane and then heating the fiber, whereby the productivity throughout the whole process including the step of producing the precursor fiber and the step of producing the carbon fiber is increased and a carbon fiber having high tensile strength and high modulus of elasticity is obtained in an industrially advantageous manner.

It is already known to obtain carbon fibers which are excellent for use as reinforcing materials, exothermic elements, heat-resisting materials, etc. by heating an acrylonitrile fiber in an oxidizing atmosphere at 200° to 400° C. so as to form a cyclized structure in the fiber, and carbonizing the cyclized fiber in a non-oxidizing atmosphere at a higher temperature (normally above 800° C.).

However, the so-called thermal stabilization step, which is the step of forming naphthyridine rings in the acrylonitrile fiber by heat-treating the fiber in an oxidizing atmosphere, is a very important step that governs the physical properties of the resulting carbon fiber, the final product. It has been thought that this step requires of time, and this has been the cause of the low productivity of carbon fibers.

If a condition of high-temperature thermal stabilization or an operation of a sharp temperature rise is employed in order to heighten the productivity of carbon fibers, abrupt reactions such as intermolecular cross-linking and intramolecular cyclization will occur at a temperature about the exothermic transition point of the fiber. Accompanied with such reaction, local accumulation of heat takes place which causes an uneven reaction to produce a pitch-like or tar-like substance. Such a substance causes mutual adhesion of filaments or exerts an undesirable influence on the physical properties of the carbon fiber, for example a decrease in mechanical strength. Also, in the case of applying tension to acrylonitrile fibers in the thermal stabilization step in order to obtain thermally stabilized fibers capable of producing carbon fibers having excellent properties, it has been extremely difficult to heat treat the fibers at a predetermined extension ratio because the modulus of elasticity or the extension-susceptible region of the acrylonitrile fibers upon heat treatment varies depending on the heat treatment temperature.

Therefore, various processes have been proposed to accelerate the cyclization reaction so that thermally stabilized fibers can be obtained in a short time. All these processes, however, have not necessarily contributed to the improvement in economy and industrial productivity of carbon fibers of excellent physical properties, because such processes involve copolymerizing a special comonomer with the fiber-forming polymer, or employing a treatment with a special or harmful chemical, or employing a complicated thermal stabilization step.

As regards the prevention of fiber fusion-adhesion upon heat treatment, a process is proposed in Disclosed Japanese Patent Application No. 117725/1974, wherein a longchain silicone oil is applied to the fiber and then the fiber is subjected to thermal stabilization or thereafter further to carbonization. However, the application of the mentioned oil in the fiber production step is not effective enough to prevent the static electricity generated by friction with rollers or the like, and this gives rise to troubles such as filament fluffiness, spreading and breakage. Also, the application of said oil exerts hardly any effect on the acceleration of thermal stabilization reactions such as cross-linkage and cyclization in the thermal stabilization step, thus failing in the improvement in the productivity of carbon fibers by means of the sharp temperature rise operation.

In the light of such a situation of the prior art, we made an intensive study to overcome the above-mentioned defects and to obtain high quality carbon fibers in an industrially advantageous manner. As a result, we have found that, by heat-treating under specific conditions an acrylonitrile fiber to which a specific aminosiloxane has been applied in the fiber production step, and then heating the fiber, all troubles such as filament fluffiness, breakage and disorder of the precursor fiber are completely avoided, and at the same time the heating time is shortened to a great extent and the tension applying operation upon heating is facilitated, so that a carbon fiber having excellent physical properties can be produced in an industrially advantageous manner.

The main object of the present invention is to produce carbon fibers having excellent properties in an industrially advantageous manner.

Another object of the invention is to provide a process by which such troubles as filament fluffiness, breakage, and disorder are eliminated and carbon fibers having high strength and high modulus of elasticity can be produced by heating in a short time.

Still another object of the invention is to provide a process by which the production efficiency and working condition are improved throughout the whole process, including the precursor fiber production step and the carbon fiber production step, and high quality carbon fibers can be produced by heattreating under specific conditions an acrylonitrile fiber treated with a specific aminosiloxane in the fiber production step and then heating the fiber.

Figure 2:
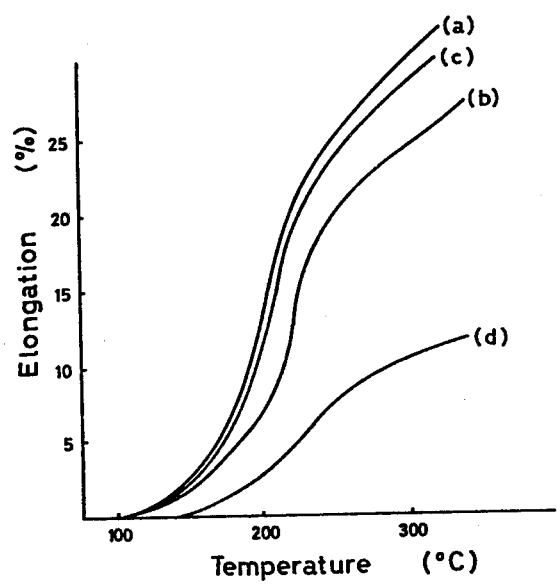

Other objects of the invention will become apparent from the following concrete description of the invention which will be made by referring partly to the accompanying drawings wherein;

FIG. 1 shows the preferable range of temperature and time in the heat treatment of aminosiloxane-containing acrylonitrile fiber according to this invention, and FIG. 2 shows variation of elongation of various acrylonitrile fibers upon heating.

These objects of the present invention are attained by heat-treating an acrylonitrile fiber impregnated with or containing at least 0.01%, based on the total weight of the fiber, of an aminosiloxane at a temperature of at least 150° C. for 0.1 second to 30 minutes so that the fiber contains 20 to 80 weight percent undissolved matter upon immersing it in a 60% aqueous solution of sodium thiocyanate at 80° C. for 20 minutes; and then heating the fiber in the usual way to carbonize or graphitize it; said aminosiloxane having the following formula:

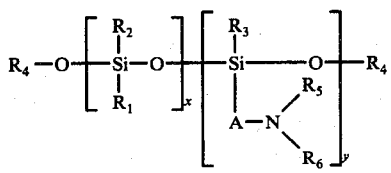

wherein $R_1$ is a hydrogen atom, a lower alkyl group or an aryl group; $R_2$ and $R_3$ are each a lower alkyl group or an aryl group; $R_4$ is a hydrogen atom or a

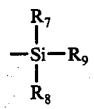

group wherein $R_7$ and $R_8$ are each a lower alkyl group and $R_9$ is a hydrogen atom or a lower alkyl group; $R_5$ and $R_6$ each is a hydrogen atom or lower alkyl group, A is an alkylene group containing not more than 5 carbon atoms or an arylene group; and $x$ and $y$ are positive integers which provide a molecular weight of the aminosiloxane of not more than 100,000.

It is supposed that, by incorporating the particular aminosiloxane according to the present invention into the acrylonitrile fiber, initiating points of cross-linking, cyclizing and dehydrating reactions might be formed within the fiber upon heating, by means of amino side-chains of the aminosiloxane. Such initiating points may accelerate the intramolecular cyclization reaction of nitrile groups, dehydration reaction and cross-linking reaction by oxidation in the thermal stabilization step and make these reactions progress moderately to the core of the fiber. Therefore, the exothermic reaction accompanying the deterioration and decomposition of the fiber can be effectively controlled. Accordingly, it is possible to shorten the heating time to a great extent by the employment of the thermal stabilization conditions based on the sharp temperature rise operation.

At the same time, by employing the process of the present invention, the extensibility of the region of acrylonitrile fibers susceptible to extension upon heating is suppressed and the fiber represents a stable extension throughout the whole range of the thermal stabilization temperatures so that the tension acts uniformly on the fiber to make the operation of tension application very easy. This advantageously prevents the fiber breakage at the extension-susceptible region and makes it possible to produce a thermally stabilized fiber at a desired percent extension.

Further, since the above-mentioned aminosiloxane is contained in acrylonitrile fibers or impregnated in the same in the fiber production step, the generation of static electricity due to friction by rollers and the like is effectively suppressed. Thus, troubles such as filament breakage, fluffiness and spreading are avoided so that the efficiency in continuous operation in the production of acrylonitrile precursor fibers and the stability in quality thereof can be markedly improved.

The acrylonitrile fibers used in the present invention are those produced from acrylonitrile homopolymers or copolymers containing acrylonitrile in an amount of at least 85 mol percent, preferably not less than 90 mol percent. Among the copolymeric components there may be mentioned well-known ethylenically unsaturated compounds such as allyl alcohol, methallyl alcohol, hydroxyalkylacrylonitriles, acrylic acid, methacrylic acid, itaconic acid, crotonic acid, methacrylonitrile, α-methyleneglutaronitrile, isopropenyl acetate, acrylamide, N-methylolacrylamide, β-hydroxyethyl methacrylate, dimethylaminoethyl methacrylate, vinylpyridine, vinylpyrrolidone, methyl acrylate, methyl methacrylate, vinyl acetate, allyl chloride, sodium methallylsulfonate, potassium p-styrenesulfonate, etc. Such a homopolymer or copolymer of acrylonitrile is generally produced by the well-known polymerization processes such as solvent polymerization, mass polymerization, emulsion polymerization or suspension polymerization. The solvents used in producing acrylonitrile fibers from these polymers include organic solvents such as dimethylformamide, dimethylacetamide, and dimethyl sulfoxide; and inorganic solvents such as aqueous solutions of nitric acid, zinc chloride and thiocyanates. Such a polymer solution is spun to form filaments in the usual way.

As the methods for impregnating acrylonitrile fibers with the particular aminosiloxane or making them to contain the aminosiloxane according to the present invention, a method wherein the aminosiloxane is added to the spinning solution and then the spinning solution is spun, or a method wherein an acrylonitrile fiber in a water-swollen state, obtained by spinning, is treated with the aminosiloxane to impregnate the fiber with it, is preferably used. The water-swollen fiber can be advantageously produced generally by the usual wet-spinning process or by the dry-wet spinning process which comprises extruding the spinning solution through a spinnerette into an inert gas atmosphere, followed by introducing the extruded spinning solution into an aqueous coagulating bath to coagulate it into filaments.

The particular aminosiloxane used in the present invention is a random copolymer consisting essentially of substituted siloxyl and aminosiloxyl recurring units, as shown by the above-mentioned general formula, and a liquid polymer having a molecular weight of not more than 100,000 is generally used. The lower limit of the molecular weight of such an aminosiloxane should be generally about 2000, and it is preferable that the ratio ($x : y$) of the substituted siloxyl units ($x$) to the aminosiloxyl units ($y$) should be 4 – 200 : 1. The lower alkyl groups selected as $R_1$, $R_2$, $R_3$, $R_5$, $R_6$, $R_7$, $R_8$ and $R_9$ are generally those having 1 to 6 carbon atoms, and particularly those having not more than 4 carbon atoms are preferably used.

It is necessary that such an aminosiloxane should be incorporated into the acrylonitrile fiber in an amount of at least 0.01%, preferably at least 0.05% based on the weight of the fiber. With an amount of less than 0.01%, it is difficult to sufficiently display the effect of the present invention. On the other hand, incorporation of too much of the aminosiloxane is not economical since no better effect is expected. Therefore, it is desirable that the upper limit of the amount of the aminosiloxane should be on the order of about 5% based on the weight of the fiber.

In the actual practice, for applying such an aminosiloxane to a water-swollen acrylonitrile fiber, a method is preferably employed wherein the fiber is treated with an emulsion obtained by emulsifying the aminosiloxane with a suitable emulsifying agent. Further, it is possible to use a disperse medium except water, or to treat the fiber directly with a single aminosiloxane or a mixture of aminosiloxanes, or to treat the fiber with a solution of the aminosiloxane in a solvent such as chlorinated hydrocarbons, petroleum ether, n-hexane, cyclohexane, or benzene, etc.

The water-swollen fiber to which the aminosiloxane may be applied is a gel fiber obtained by spinning, after having been subjected to water-washing and stretching generally at a ratio above 3 times, preferably above 4 times, in hot water and/or heated steam, and before drying. Especially, to make the aminosiloxane penetrate uniformly and sufficiently into the interior of the fiber, it is desirable that the gel fiber should have a water content of from 20 to 200% based on the dry weight of the fiber. The aminosiloxane emulsion which may be preferably used for the treatment of the water-swollen fiber can be generally prepared using as the emulsifier, a POE (n) alkylphenyl phosphate (wherein POE is polyoxyethylene and $n$ shows the degree of polymerization of the polyoxyethylene) such as POE (8) octylphenyl phosphate, POE (9) octylphenyl phosphate, POE (8) nonylphenyl phosphate, POE (9) nonylphenyl phosphate or POE (10) dodecylphenyl phosphate.

The water-swollen acrylonitrile fiber thus treated with the aminosiloxane according to the present invention is generally subjected to a drying-compacting treatment to remove voids present within the fiber so that the fiber structure is compacted. However, it is permissible to subject the water-swollen fiber to the subsequent heat treatment without carrying out the drying-compacting treatment.

It is necessary that the thus-obtained acrylonitrile fiber made to contain or impregnate with the particular aminosiloxane should be subjected to a specific heat treatment before the heating operation of producing carbon fibers. Where the fiber is not subjected to this heat treatment, it is impossible to display the excellent features of the present invention in the carbon fiber production step. It is necessary that this heat treatment should be performed at a temperature of at least 150° C. for 0.1 second to 30 minutes, preferably 0.2 second to 20 minutes. The upper limit of the heat treatment is about 650° C. In the case of exceeding this temperature, the fiber becomes liable to break and such a temperature is not favorable. Preferable temperatures are from 160° to 550° C. By this heat treatment, yellow or brown colored fibers are obtained. It is necessary to employ such heat treatment conditions so that when the fiber is immersed for 20 minutes in a 60% aqueous solution of sodium thiocyanate maintained at 80° C., the undissolved matter amounts to 20 to 80 weight percent. When the undissolved matter is less than 20 weight percent, the heat treatment is insufficient, and the effects according to the present invention in the heating steps cannot be fully displayed. When the undissolved matter exceeds 80 weight percent, the fiber becomes brittle, so that various troubles are caused in the heating steps (especially in the thermal stabilization step).

The heat-treated fiber showing such a solubility in a 60% aqueous solution of sodium thiocyanate is obtained by employing suitable conditions within the above-mentioned treating temperatures and treating periods. In general, the temperature and time of the portion shown by shading in FIG. 1 are preferably employed. It is usual that in this heat treatment a tension generally of 0.1 to 0.5 g/d, preferably of 0.18 to 0.45 g/d, is applied to the fiber and the fiber is maintained under a fixed, elongated or restricted shrunken length. This heat treatment may be performed in a different step from the drying-compacting treatment or may be performed at the same time with the drying-compacting treatment. Any method may be adopted provided that the acrylonitrile fiber containing the specific aminosiloxane is subjected to the above-mentioned heat treatment.

In producing carbon fibers from the acrylonitrile fiber which has been subjected to the specific heat treatment, any known heating method may be employed. Generally, however, a heating method is preferred which comprises a first heating step (so-called thermal stabilization step) in which the fiber is heated at 150° to 400° C. in an oxidizing atmosphere and a second heating step in which the thermally stabilized fiber is heated at higher temperatures (normally above 800° C.) in a non-oxidizing atmosphere or under reduced pressure to carbonize or graphitize the fiber. Usually the carbonization temperature is 800° – 2000° C. For the graphitization the resulting carbon fiber is further heated, generally to 2000° – 3500° C.

Although air is suitable as the atmosphere for use in thermal stabilization, the fiber may be thermally stabilized in the presence of hydrogen chloride gas, sulfur dioxide gas or nitrogen monoxide gas, or under irradiation of light. Among the atmospheres for use in carbonization or graphitization, nitrogen, hydrogen, helium and argon are preferred. To obtain a carbon fiber having a better tensile strength and modulus of elasticity, it is preferable to heat the fiber under tension (normally 0.1 to 0.5 g/d) as is generally known. It is particularly effective to apply tension at the time of thermal stabilization and carbonization or graphitization. The carbonization or graphitization may be carried out under reduced or increased pressure.

By employing such a process of the present invention, it is now possible to produce a carbon fiber which is very excellent in tensile strength and modulus of elasticity at a high production efficiency and in a short time. Accordingly, the carbon fiber having such excellent properties can be advantageously used in the wide field of reinforcing material, exothermic elements, refractory materials, etc.

For a better understanding of the present invention, representative examples of the invention are set forth hereinafter. The percentages and parts in the examples are by weight unless otherwise specified.

EXAMPLE 1

A spinning solution was obtained by dissolving 17 parts of an acrylonitrile copolymer containing 97% acrylonitrile in 83 parts of a 50% aqueous solution of sodium thiocyanate. After this spinning solution was extruded into air through a spinnerette, it was introduced into a 12% aqueous solution of sodium thiocyanate to form coagulated filaments. Thereafter, the fiber was washed with water and then stretched 3 times the length in boiling water, and further stretched 2.5 times in superheated steam to obtain an acrylonitrile fiber in a swollen state having a water content of 160% and having a single-filament fineness of 1.3 denier.

The water-swollen fiber was then immersed into an aqueous emulsion consisting of 100 parts of an aminosiloxane ($NH_2$ content 0.5%) of the following formula:

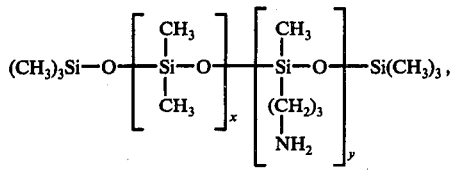

50 parts of POE (9) nonylphenyl phosphate and 4 parts of zinc acetate as the catalyst, and thereafter the fiber was dried at 120° C. for 3 minutes. In this way, an acrylonitrile fiber impregnated with 0.42% of the aminosiloxane was obtained. The fiber thus obtained was free from such defects as filament fluffiness, breakage and spreading. Subsequently, this fiber containing the aminosiloxane was heat-treated under a definite length at 230° C. for one minute. On immersing the treated fiber thus obtained into a 60% aqueous solution of sodium thiocyanate maintained at 80° C. for 20 minutes, the ratio of the undissolved matter in this solution was found to be 21%. On the other hand, when the same fiber dried without the aminosiloxane treatment was subjected to the above-mentioned heat treatment, the ratio of the undissolved matter of the treated fiber thus obtained in a 60% aqueous solution of sodium thiocyanate solution was found to be 4%. The two kinds of fibers were thermally stabilized in an air atmosphere under a definite length at 230° C. for 3 hours, respectively. On examining the two thermally stabilized fibers for their fusion-adhesion between filaments, the aminosiloxane-containing fiber was completely free from fusion-adhesion, but the fiber without the aminosiloxane treatment had remarkable fusion-adhesion.

In general, with the progress of the heat decomposition of the fiber, the solubility of the fiber in the aqueous solution of sodium thiocyanate decreases, namely the ratio of the undissolved matter increases. The above-mentioned result shows that, when a specific aminosiloxane is incorporated into the fiber according to the present invention, its accelerating effect on the heat decomposition is very high. It is also understood that the aminosiloxane used in the present invention not only accelerates the heat decomposition but also satisfactorily prevents the fusion-adhesion between filaments in the thermal stabilization step, so that the thermal stabilization operation becomes very easy.

The above-mentioned acrylonitrile fiber impregnated with the aminosiloxane was subjected to the various heat treatments shown in Table 1, and the ratio of the undissolved matter in a 60% aqueous solution of sodium thiocyanate for each heattreated fiber was obtained. Each of the fibers after the heat treatment was subjected to a thermal stabilization treatment by passing it continuously under an air atmosphere through an electric furnace having a continuous temperature gradient from 200° to 280° C. under a tension of 42 g/d, spending 25 minutes, and then it was carbonized by further passing it continuously under a nitrogen atmosphere through an electric furnace having a continuous temperature gradient from 250° C. to 1300° C., spending 2 minutes. The physical properties of the carbon fibers thus obtained were measured and are shown in Table 1.

As apparent from the results in Table 1, it will be understood that, when the ratio of the undissolved matter in a 60% aqueous solution of sodium thiocyanate is in the range of from 20 to 80%, carbon fibers having excellent physical properties can be obtained.

Table 1

| Heat treatment conditions | Undissolved matter (%) | Physical properties of the carbon fibers | |
|---|---|---|---|
| | | Strength (kg/mm$^2$) | Young's modulus (ton/mm$^2$) |
| — | 0 | The fiber was broken in the thermal stabilization step. | |
| 200° C. × 20 min. | 49 | 347 | 25 |
| 200° C. × 60 min. | 87 | 222 | 19 |
| 550° C. × 0.1 sec. | 15 | The fiber was broken in the thermal stabilization step. | |
| 550° C. × 0.3 sec. | 65 | 370 | 25 |
| 680° C. × 0.1 sec. | 91 | The fiber was broken in the thermal stabilization step. | |

EXAMPLE 2

The acrylonitrile fiber containing the aminosiloxane or the acrylonitrile fiber not containing the same, obtained in Example 1 was heat-treated at 210° C. for 3 minutes or not heat-treated. Thereafter, each of these fibers was heated in air under a definite tension of 0.28 g/d with a temperature increase of 3° C./min. from 80° C. The variation in elongation of these fibers at various temperatures was measured and the results are shown in FIG. 2.

As apparent from FIG. 2, the fiber (a) which was not subjected to the aminosiloxane treatment and the heat treatment, the fiber (b) which was subjected only to the heat treatment and the fiber (c) which was subjected only to the aminosiloxane treatment began to elongate from about 100° C., and as the temperature rises the elongation increased sharply. On the other hand, the fiber (d) which was subjected to both the aminosiloxane treatment and the heat treatment began to elongate at about 160° C. and thereafter shows a stable elongation as a whole, with the sharp elongation in the temperature range of from 180° to 240° C. being suppressed. This fact shows that in those cases in which the present invention is not followed, the tension control at the early stage of the thermal stabilization treatment is difficult, while on the other hand, by following the present invention the sharp variation in elongation in the thermal stabilization step is suppressed, so that the tension control is easy and the molecular orientation of the acrylonitrile fiber, i.e. the precursor fiber for a carbon fiber, is not impaired.

In fact, when these four kinds of fibers were subjected to the same heating operation as in Example 1, the fibers (a), (b) and (c) were broken at the thermal stabilization step and it was impossible to obtain satisfactory carbon fibers, while on the other hand, from the fiber (d) according to the process of the present invention, an excellent carbon fiber having a strength of 370 kg/mm$^2$ and a Young's modulus of 25 ton/mm$^2$ was obtained.

EXAMPLE 3

The water-swollen acrylonitrile fiber obtained in Example 1 was treated with aqueous emulsions of various concentrations of the same aminosiloxane as in Example 1, respectively. Thereafter, these treated fibers were dried with drying rollers. In this way, various acrylonitrile fibers having different contents of the aminosiloxane were obtained. After each of these fibers were then heat-treated at 180° C. for 12 minutes, they were subjected to thermal stabilization treatment by passing them under an air atmosphere through an electric furnace similar to that in Example 1 under a tension of 0.20 g/d, spending 30 minutes. Thereafter, they were subjected to carbonization treatment by passing them continuously under a nitrogen atmosphere from 250° to 1250° C., spending 2 minutes.

The physical properties of the carbon fibers thus obtained are shown in Table 2.

Table 2

| Content of the amino-siloxane (%) | Physical properties of the carbon fibers | |
|---|---|---|
|  | Strength (kg/mm$^2$) | Young's modulus (ton/mm$^2$) |
| 0 (Blank) | 248 | 23 |
| 0.005 | 263 | 24 |
| 0.02 | 301 | 25 |
| 0.1 | 350 | 26 |
| 0.3 | 387 | 27 |
| 2.5 | 348 | 26 |
| 5.0 | 289 | 24 |

What we claim is:

1. A process for producing carbon fibers which comprises (1) heat-treating an acrylonitrile fiber impregnated with or containing at least 0.01%, based on the total weight of the fiber, of an aminosiloxane at a temperature of at least 150° C for 0.1 second to 30 minutes such that the heat-treated fiber contains 20 to 80 weight percent of undissolved matter, measured on the basis of immersion of the heat-treated fiber in a 60% aqueous solution of sodium thiocyanate at 80° C for 20 minutes, and (2) carbonizing or graphitizing the heat-treated fiber, said aminosiloxane having the formula

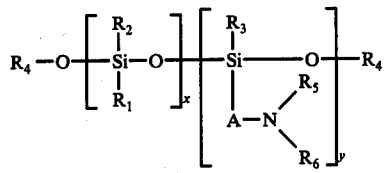

wherein $R_1$ is hydrogen, lower alkyl or aryl, $R_2$ and $R_3$ are each lower alkyl or aryl, $R_4$ is hydrogen or a

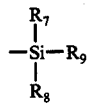

group wherein $R_7$ and $R_8$ are each lower alkyl and $R_9$ is hydrogen or lower alkyl, $R_5$ and $R_6$ are each hydrogen or lower alkyl, A is alkylene containing not more than 5 carbon atoms or arylene, and $x$ and $y$ are positive integers which impart a molecular weight of not more than 100,000 to the aminosiloxane.

2. A process as claimed in claim 1 wherein the acrylonitrile fiber contains at least 90 mol % of acrylonitrile.

3. A process as claimed in claim 1 wherein the acrylonitrile fiber is impregnated with or contains 0.05 – 5% by weight of the aminosiloxane.

4. A process as claimed in claim 1 wheren the heat-treatment of the acrylonitrile fiber is conducted at 160° – 550° C.

5. A process as claimed in claim 1 wherein the heat-treatment of the acrylonitrile fiber is conducted for 0.2 second – 20 minutes.

6. A process as claimed in claim 1 wherein the heat-treatment is conducted under such temperature and time conditions as defined by the shade area in FIG. 1.

7. A process as claimed in claim 1 wherein the heat-treated acrylonitrile fiber is thermally stabilized by being heated in an oxidizing atmosphere at a temperature of from 150° C. to 400° C., and is thereafter carbonized or carbonized and then graphitized in a non-oxidizing atmosphere at a temperature above 800° C.

8. A process as claimed in claim 7 wherein the heat-treated acrylonitrile fiber is thermally stabilized while being heated under tension.

9. A process as claimed in claim 8 wherein the tension is 0.1–0.5 g/d.

10. A process as claimed in claim 7 wherein the thermally stabilized fibers are carbonized or carbonized and then graphitized under tension.

11. A process as claimed in claim 1 wherein the tension is 0.1–0.5 g/d.

12. A process as claimed in claim 7 wherein the oxidizing atmosphere is air.

13. A process as claimed in claim 7 wherein the thermally stabilized fibers are carbonized in a non-oxidizing atmosphere at a temperature of from 800° C. to 2000° C. and then graphitized in a non-oxidizing atmosphere at a temperature of from 2000° C. to 3500° C.

14. A process as claimed in claim 7 wherein the non-oxidizing atmosphere is nitrogen.

15. A process as claimed in claim 1 wherein the acrylonitrile fiber contains at least 85 mol % of acrylonitrile.

16. A process as claimed in claim 1 wherein the acrylonitrile fiber subjected to heat-treatment is prepared by adding the aminosiloxane to an acrylonitrile fiber-producing spinning solution, and spinning the spinning solution.

17. A process as claimed in claim 1 wherein the acrylonitrile fiber subjected to heat-treatment is prepared by spinning an acrylonitrile fiber-producing spinning solution to obtain a water-swollen acrylonitrile fiber, and impregnating the water-swollen acrylonitrile fiber with the aminosiloxane.

18. A process as claimed in claim 1 wherein the water content in the water-swollen acrylonitrile fiber is 20 – 200% based on the dry weight of the fiber.

19. A process as claimed in claim 1 wherein the molecular weight of the aminosiloxane is 2000 – 100,000 and the ratio of $x:y$ in the aminosiloxane is 4–200:1.

* * * * *